US012295069B2

(12) United States Patent
Balan et al.

(10) Patent No.: US 12,295,069 B2
(45) Date of Patent: May 6, 2025

(54) NETWORK SERVICE CONTINUITY IN IP MULTIMEDIA SUBSYSTEM LAYER

(71) Applicant: T-MOBILE INNOVATIONS LLC, Overland Park, KS (US)

(72) Inventors: Harikishore Allu Balan, Snohomish, WA (US); Saqib Badar, Bellevue, WA (US); Shujaur Rehman Mufti, Snoqualmie, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 414 days.

(21) Appl. No.: 17/749,820

(22) Filed: May 20, 2022

(65) Prior Publication Data

US 2023/0379686 A1    Nov. 23, 2023

(51) Int. Cl.
*H04W 8/04*   (2009.01)

(52) U.S. Cl.
CPC .................................... *H04W 8/04* (2013.01)

(58) Field of Classification Search
CPC ...................................................... H04W 8/04
See application file for complete search history.

(56) References Cited

U.S. PATENT DOCUMENTS

| 2009/0147929 | A1* | 6/2009 | Zhao ................... H04W 12/086 379/46 |
| 2010/0149995 | A1* | 6/2010 | Khan ..................... H04L 43/00 370/242 |
| 2014/0018039 | A1* | 1/2014 | Lau ......................... H04W 8/20 455/411 |
| 2021/0281646 | A1* | 9/2021 | Christopher ........ H04L 61/5007 |

* cited by examiner

*Primary Examiner* — Barry W Taylor
(74) *Attorney, Agent, or Firm* — SHOOK, HARDY & BACON L.L.P.; Elena K. McFarland (57) ABSTRACT

Methods, media, and systems are provided for continuity of a telecommunications network service in an IP Multimedia Subsystem (IMS) layer providing telecommunications network services to devices located on an island. The IMS layer may comprise a Call Session Control Function (CSCF) or an application server. A diameter routing agent (DRA) or other diameter traffic controller associated with the CSCF transmits a request to a Home Subscriber Server (HSS) (e.g., that is located on a mainland). The CSCF, application server, or both have a skip HSS flag comprising instructions for connectivity loss with the HSS. Based on determining a loss of connectivity with the HSS, a Serving CSCF associated with the island is automatically selected or the Serving CSCF automatically transmits a response indicating the request was successful registering a user device, such that the user device continues working remotely on the island.

18 Claims, 7 Drawing Sheets

NETWORK SERVICE CONTINUITY IN IP MULTIMEDIA SUBSYSTEM LAYER

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for mitigating disruption of a telecommunications network service in an IP Multimedia Subsystem (IMS) layer, substantially as shown in and/or described in connection with at least one of the figures, and as set forth more completely in the claims.

In aspects set forth herein, and at a high level, the systems and methods comprise introducing a skip Home Subscriber Server (HSS) flag in a Call Session Control Function (CSCF) or an application server (e.g., a Telephony Application Server (TAS)). In aspects, the CSCF and TAS are in communication with a diameter routing agent (DRA). A request may be transmitted by the DRA to an HSS and a loss of connectivity between the DRA and HSS can be determined based on the request transmitted. Based on the loss of connectivity, a local Serving CSCF may be automatically selected based on a Fully Qualified Domain Name when the request is initially transmitted by a local Interrogating CSCF. In other aspects, based on the loss of connectivity, a Session Initiation Protocol (SIP) response is automatically transmitted from the local Serving CSCF to the local Interrogating CSCF when the request is initially transmitted by the local Serving CSCF. The SIP response indicates that the request was successful for registration of a user device. In other aspects, based on the loss of connectivity, the TAS skip HSS flag provides for User Authorization Request and Server Assignment Request handling associated with a local default profile of a user based on e P-Access Network-Information to anchor a registration or call setup.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AS Application Server
BGCF Breakout Gateway Control Function
BSF Binding Support Function
CD-ROM Compact Disk Read Only Memory
CDMA Code Division Multiple Access
DAL Data Access Layer
DNS Domain Name System
DRA Diameter Routing Agent
eNB Evolved Node B
ENUM E.164 Number to URI Mapping
FQDN Fully Qualified Domain Name
gNB Next Generation Node B
GPRS General Packet Radio Service
GSM Global System for Mobile communications
DVD Digital Versatile Discs
EEPROM Electrically Erasable Programmable Read Only Memory
EMS Enhanced Message Service
FD-MIMO Full-Dimension Multiple-Input Multiple-Output
HSS Home Subscriber Server
I-CSCF Interrogating Call Session Control Function
I-SBC Interconnect Session Border Controller
iFC Initial Filter Criteria
IMS IP Multimedia Subsystem
LIA Location Information Answer
LIR Location Information Request
LTE Long Term Evolution
MAA Multimedia Authorization Answer MAR Multimedia Authorization Request
MIMO Multiple-Input Multiple-Output
MMS Multi-media Message Service
MU-MIMO Multi-User Multiple-Input Multiple-Output
NR New Radio
P-CSCF Proxy Call Session Control Function
PC Personal Computer
PDA Personal Digital Assistant
RAM Random Access Memory
RF Radio-Frequency
ROM Read Only Memory
RRU Remote Radio Unit
S-CSCF Serving Call Session Control Function
SAA Server Assignment Answer
SAR Server Assignment Request
SCP Service Communication Proxy
SIP Session Initiation Protocol
SMS Short Message Service
SNA Subscribe-Notifications-Answer
SNR Subscribe-Notifications-Request
TAS Telephony Application Server
TDMA Time Division Multiple Access
UAA User Authorization Answer
UAR User Authorization Request
UDA User-Data-Answer
UDR User-Data-Request In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Additionally, a "user device," as used herein, is a device that has the capability of using a wireless communications network, and may also be referred to as a "computing device," "mobile device," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A UE may be, in an embodiment, user device 700, described herein with respect to FIG. 7.

A computing device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or combinations thereof. Internet-of-things devices may be stationary, mobile, or both. In some aspects, the computing device is associated with a vehicle (e.g., a video system in a car capable of receiving media content stored by a media device in a house when coupled to the media device via a local area network. In some aspects, the computing device comprises a medical device, a location monitor, a clock, other wireless communication devices, or combinations thereof.

Further, the term "telecommunications network service" provided by the IMS layer, as used herein, includes wireless communications via the transfer of information via one or more of the following: radio waves (e.g., Bluetooth®), satellite communication, infrared communication, microwave communication, Wi-Fi, and mobile communication. Telecommunications network services may be provided via one or more wireless telecommunication technologies or standards, including, but not limited to, CDMA 1xAdvanced, GPRS, Ev-DO, TDMA, GSM, WiMax technology, LTE, LTE Advanced, 4G, 5G, 6G, or other generation communication systems, among other technologies and standards. The telecommunications network services may be provided via a network (e.g., the transfer of information without the use of an electrical conductor as the transferring medium).

In aspects, the network may be a telecommunications network(s), or a portion thereof. A telecommunications network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a telecommunications network can connect one or more subscribers to a corresponding immediate service provider for services such as 5G and LTE, for example. In aspects, a network provides voice, message (e.g., SMS messages, MMS messages, instant messaging messages, EMS messages), or data services to user devices or corresponding users that are registered or subscribed to utilize the services provided by a telecommunications provider. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, and any combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay cell sites, or other network components. The network may interface with cell sites or access points through one or more wired or wireless backhauls. As such, the cell site and access point may communicate via the network or directly. Furthermore, user devices can utilize the network to communicate with other devices (e.g., a mobile device(s), a server(s), a personal computer(s), etc.) through the cell site or access point.

As used herein, the term "cell site" (used for providing UEs with access to the telecommunications network services) generally refers to one or more cellular base stations, nodes, RRUs control components, and the like (configured to provide a wireless interface between a wired network and a wirelessly connected user device). A cell site may comprise one or more nodes (e.g., eNB, gNB, and the like) that are configured to communicate with user devices. In some aspects, the cell site may include one or more band pass filters, radios, antenna arrays, power amplifiers, transmitters/receivers, digital signal processors, control electronics, GPS equipment, and the like. An eNB or gNB corresponding to the cell site may comprise one or more of a macro base station, a small cell or femto base station, a relay, and so forth. In aspects, the cell site may be configured as FD-MIMO, massive MIMO, MU-MIMO, cooperative MIMO, 3G, 4G, 5G, another generation communication system, or 802.11. In addition, the cell site may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, connectivity loss between an HSS of a mainland and an island telecommunications network environment, having an IMS layer, cause IMS interruptions to all UE subscribers located within the network environment. For example, all subscribers to the IMS are impacted due to connectivity loss of the IMS layer with the HSS of the mainland. As such, all mobile terminated calls or IMS registrations are impacted by service interruptions due to various types of connectivity losses with the HSS. As one example, all subscribers are impacted by service interruptions due to the connectivity loss associated with an MAR or SAR timeout during IMS registrations. As another example, all subscribers are impacted by service interruptions associated with a UAR timeout during IMS registration or LIR timeout for a terminating call.

To overcome these interruption issues, the present claims for provide for mitigating or preventing these disruptions of the telecommunications network service in the IMS layer associated with the island. In some embodiments, a system comprises one or more processors and computer memory storing computer-usable instructions that, when executed by the one or more processors, cause a DRA or other diameter traffic controller to perform operations. The operations comprise introducing a skip HSS flag in a CSCF or an application server associated with the DRA. The operations further comprise transmitting, via the CSCF or the application server, a request to an HSS. In response to transmitting the request, the operations comprise determining a loss of connectivity between the DRA and the HSS.

In an embodiment, based on determining the loss of connectivity between the DRA and the HSS, a local S-CSCF on the island is automatically selected based on an FQDN and based on instructions of the skip HSS flag. In another embodiment, based on determining the loss of connectivity between the DRA and the HSS, an SIP response—indicating the request was successful to a local I-CSCF for relay to a user device for registration—is automatically transmitted based on the instructions of the skip HSS flag.

In some embodiments, a method for mitigating disruption of a telecommunications network service in an IMS layer is provided. For example, the method comprises transmitting, via a DRA associated with a local I-CSCF and a local S-CSCF, a request to an HSS that is located above a threshold distance from an access point associated with the DRA. The method further comprises determining a loss of connectivity between the DRA and the HSS based on transmitting the request to the HSS. Based on determining the loss of connectivity: (1) the S-CSCF is automatically selected based on an FQDN when the request is transmitted by the I-CSCF to the HSS; or (2) the S-CSCF automatically transmits, to the I-CSCF, an SIP response that indicates the request was successful for registration of a UE when the request is transmitted by the S-CSCF to the HSS.

In some embodiments, one or more non-transitory computer storage media having computer-executable instructions embodied thereon that, when executed by one or more processors, cause the one or more processors to perform a method for mitigating disruption of a telecommunications network service in an IMS layer. The method comprises transmitting, via a DRA associated with a local I-CSCF and a local S-CSCF, a request to an HSS that is located above a threshold distance from an access point associated with the DRA, wherein the I-CSCF or the S-CSCF has a skip HSS flag comprising instructions for connectivity loss between the DRA and the HSS. The method further comprises determining a loss of connectivity between the DRA and the HSS based on transmitting the request to the HSS. Based on determining the loss of connectivity and the instructions of the skip HSS flag: (1) the S-CSCF is automatically selected in response to transmitting the request, which is a user authorization request or a location information request, from the I-CSCF to the HSS; or (2) the S-CSCF automatically transmits, to the I-CSCF, an SIP response that indicates the request, which is a multimedia authorization request or a server assignment request, was successful for registration of a user device in response to transmitting the request from the S-CSCF to the HSS.

Figure 1:
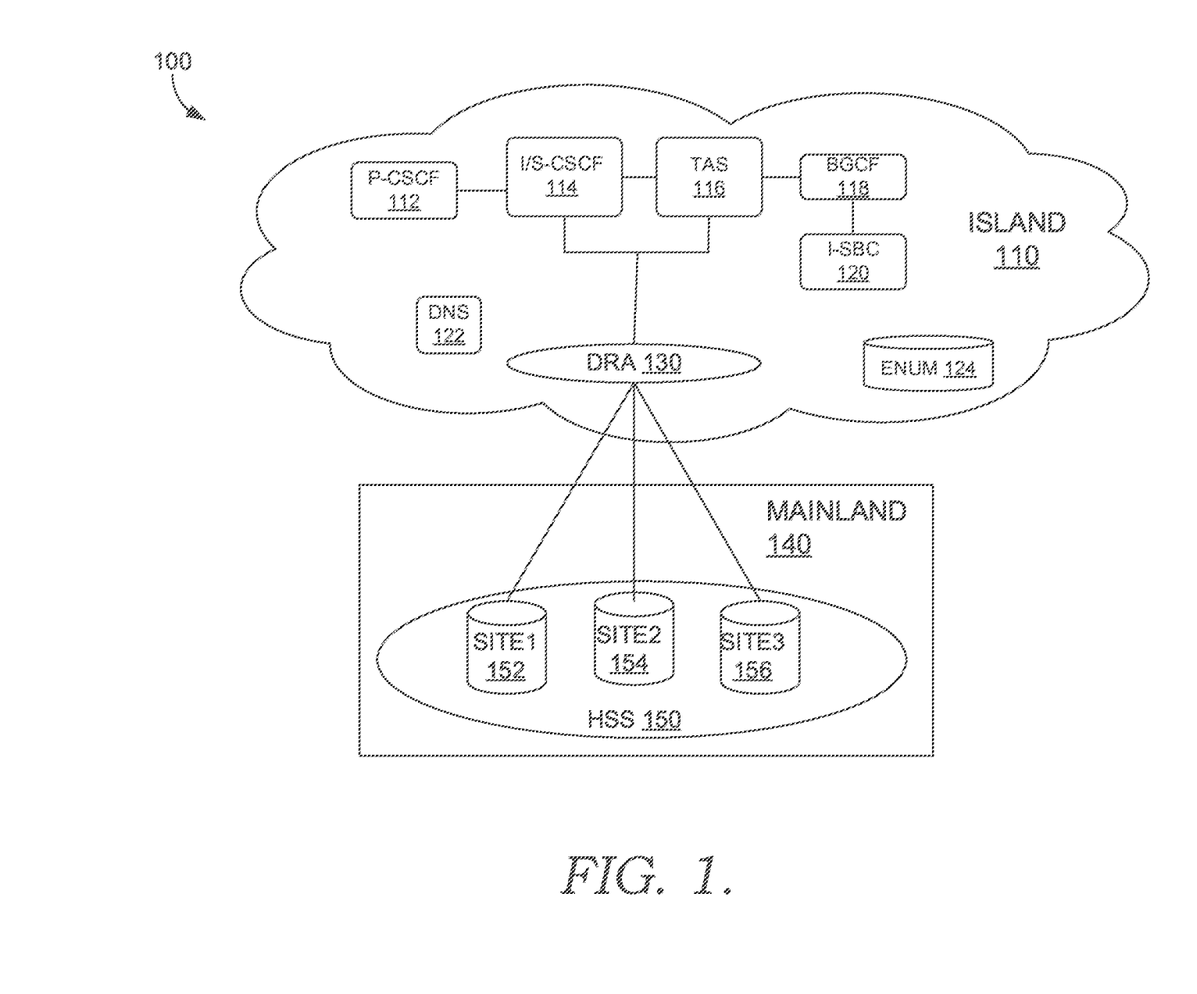
FIG. 1 depicts an example environment for providing communication services, in accordance with aspects herein.

Turning now to FIG. 1, example environment 100 comprises an island-mainland telecommunications network services architecture. In example environment 100, the telecommunications network services architecture on island 110 includes a P-CSCF 112, I/S-CSCF 114, TAS 116, BGCF 118, I-SBC 120, DNS 122, ENUM 124, and DRA 130. Additionally, the telecommunications network services architecture on mainland 140 comprises HSS 150 including SITE1 152, SITE2 154, and SITE3 156. Example environment 100 is but one example of a suitable environment for determining a priority-based pairing threshold for codebook beamforming, and is not intended to suggest any limitation as to the scope of use or functionality of the invention. Neither should the environment 100 be interpreted as having any dependency or requirement relating to any one or combination of components illustrated.

The telecommunications network services architecture on island 110 may support various types of communication and media services via an IMS layer having I/S-CSCF 114 that can manage communication sessions and register UEs located within island 110 of the IMS layer. For example, the I/S-CSCF 114 can coordinate incoming requests with the IMS layer and can interface with one or more application servers (e.g., TAS 116) of the IMS layer. The application servers can provide telecommunications services, such as voice communications and video communications. The application servers can also provide messaging services, such as an IP short message gateway for communicating short messages (e.g., SMS over IP). A UE within island 110 can connect through a cell site for access to one or more of the telecommunications network services within island 110.

The P-CSCF 112 can be an entry point into the IMS layer that routes signals (e.g., SIP messages) to or from one or more UEs. For example, when a UE attaches to the telecommunications network, an IMS registration process can occur. The IMS registration process can comprise the UE sending an SIP Register message to the P-CSCF 112. The P-CSCF 112 can subsequently route the SIP Register message to the I-CSCF.

In example environment 100, the I/S-CSCF 114 and the TAS 116 interface with the HSS 150 of mainland 140 via the DRA 130. In some aspects, a BSF, SCP, or other diameter traffic controller is used to interface with the HSS 150 instead of DRA 130. The I/S-CSCF 114 can exchange messages via the DRA 130 (or other diameter traffic controller) with the HSS 150 over a diameter protocol interface. In aspects, the I-CSCF transmits requests (e.g., HTTP requests) from the DRA 130 or another diameter traffic controller to the HSS 150 of the mainland 140 to obtain data from one or more of databases SITE2 152, SITE2 154, and SITE3 156. The I-CSCF can use the data from the one or more of databases to determine if an S-CSCF has previously been assigned to the UE. Additionally or alternatively, the I-CSCF can use the data to assign an S-CSCF to the UE. Upon assignment, the I-CSCF can forward the SIP Register message of the UE to the assigned S-CSCF.

In aspects, an S-CSCF is a registrar for the IMS layer that receives SIP Register messages originating from one or more UEs. The S-CSCF may authenticate the UEs to complete the registration. For example, during IMS registration for a UE, the S-CSCF can exchange messages with the HSS 150 of the mainland 140 to obtain data from one or more of databases SITE1 152, SITE2 154, and SITE3 156. The S-CSCF can then use that data from the databases SITE1 152, SITE2 154, and SITE3 156 to authenticate the UE. The S-CSCF can also manage communication sessions for UEs. For example, S-CSCF may send or route other types of SIP messages within the IMS.

In example environment 100, a carrier associated with the IMS layer includes other components control functions for coordinating the incoming requests, including BGCF 118, I-SBC 120, DNS 122, ENUM 124. For example, incoming requests for a roaming subscriber may be handled via a circuit switched network by one or more of the BGCF 18 and the I-SBC 120 of the carrier. As another example, the DNS 122 may comprise an FQDN and one or more identifier values or ranges associated with one or more P-CSCFs. Additionally, the DNS 122 may identify UE capabilities that are supported by one or more CSCFs. In aspects, the I/S-CSCF 114 calls the ENUM 124 to determine a domain or host name of a home carrier associated with a subscribing UE. For example, the S-CSCF may perform an ENUM query on a called number and receive a response from the ENUM 124 comprising a domain of a carrier for the called number.

Figure 2:
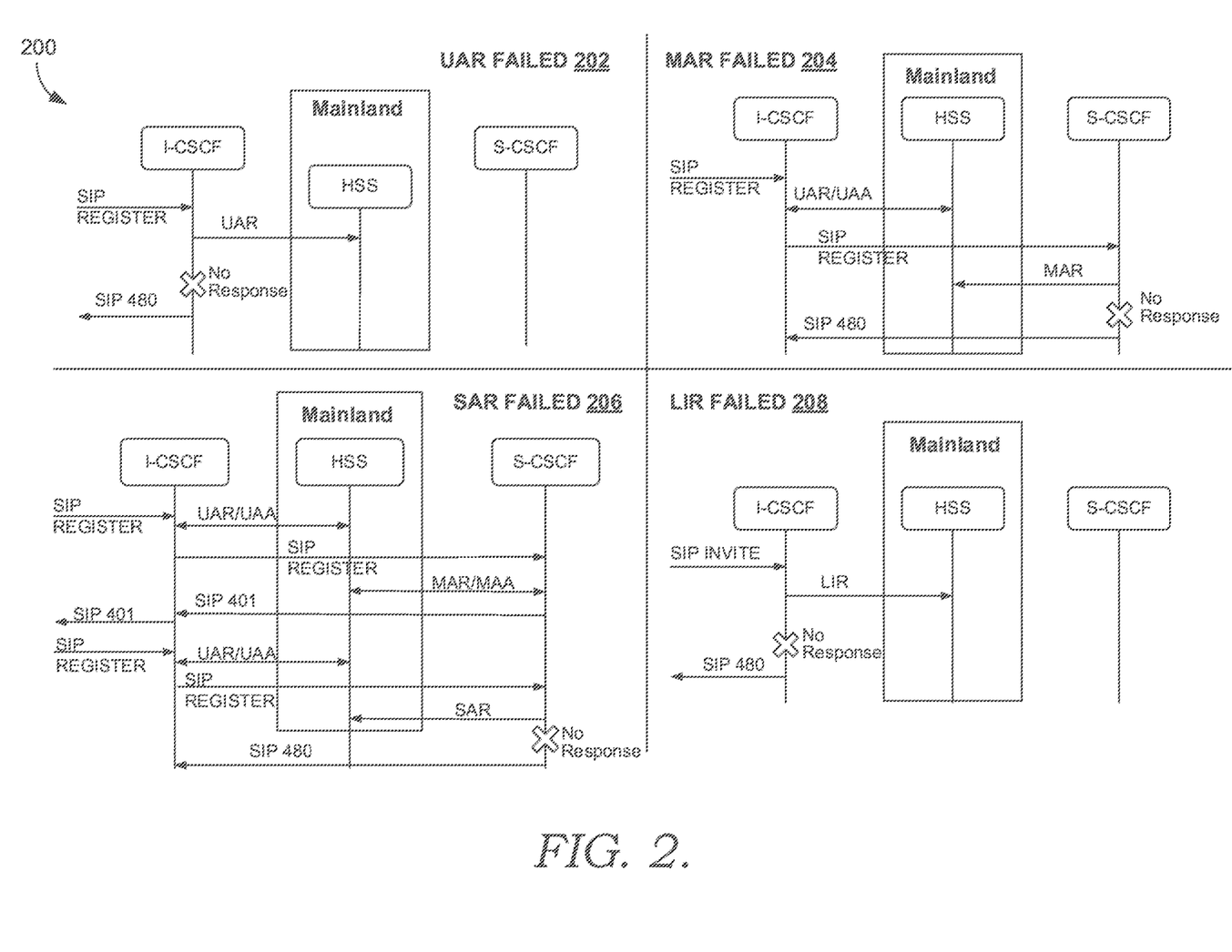
FIG. 2 depicts another example environment involving connectivity loss with a Home Subscriber Server (HSS), in accordance with aspects herein.

FIG. 2 depicts example environment 200 comprising a plurality of various connectivity losses with the HSS, the HSS associated with the mainland. For example, example environment 200 depicts the connectivity losses between one or more of I-CSCF, S-CSCF, and TAS with the HSS associated with the mainland. Quadrant 202 illustrates a connectivity loss between the I-CSCF and the HSS when the I-CSCF provides the UAR to the HSS. As depicted in example quadrant 202, the I-CSCF receives an SIP Register message from a UE or a P-CSCF. The I-CSCF transmits a UAR to the HSS. Based on not receiving a response (e.g., within a particular time period) from the HSS, the I-CSCF transmits (e.g., to a UE) a temporary unavailable error code (e.g., SIP 480) that the number dialed is not reachable temporarily.

As another example, quadrant 204 illustrates a connectivity loss between the S-CSCF and the HSS associated with an MAR timeout. As depicted in example quadrant 204, the I-CSCF receives an SIP Register message from a UE or a P-CSCF. The I-CSCF transmits a UAR to the HSS and receives a UAA from the HSS of the mainland. In response to receiving the UAA, the I-CSCF transmits the SIP Register message to the S-CSCF. Based on receiving the SIP Register message, the S-CSCF transmits an MAR to the HSS. Based on not receiving a response from the HSS to the MAR, the S-CSCF transmits a temporary unavailable error code (e.g., SIP 480) to the I-CSCF.

As another example, quadrant 206 illustrates a connectivity loss between the S-CSCF and the HSS associated with an SAR timeout. As depicted in example quadrant 206, the I-CSCF receives an SIP Register message and transmits a UAR to the HSS. In response to receiving a UAA from the HSS of the mainland, the I-CSCF transmits the SIP Register message to the S-CSCF. Based on receiving the SIP Register message, the S-CSCF transmits an MAR to the HSS. Based on receiving the MAA from the HSS, the S-CSCF transmits a message that the request is unauthorized (e.g., SIP 401) to the I-CSCF. In response to transmitting the SIP 401, the I-CSCF receives another SIP Register message and then transmits a UAR. Upon receipt of the UAA, the I-CSCF transmits this SIP Register message to the S-CSCF. The S-CSCF transmits an SAR to the HSS and does not receive a response from the HSS. Based on not receiving the response, the S-CSCF transmits a temporary unavailable error code (e.g., SIP 480) to the I-CSCF.

In yet another example, quadrant 208 illustrates a connectivity loss between the I-CSCF and the HSS associated with LIR timeout. As depicted in example quadrant 208, the I-CSCF receives an SIP Register message. The I-CSCF transmits an LIR to the HSS. Based on not receiving a response (e.g., within a particular time period) from the HSS, the I-CSCF transmits (e.g., to a UE) a temporary unavailable error code (e.g., SIP 480) that the number dialed is not reachable temporarily.

Figure 3:
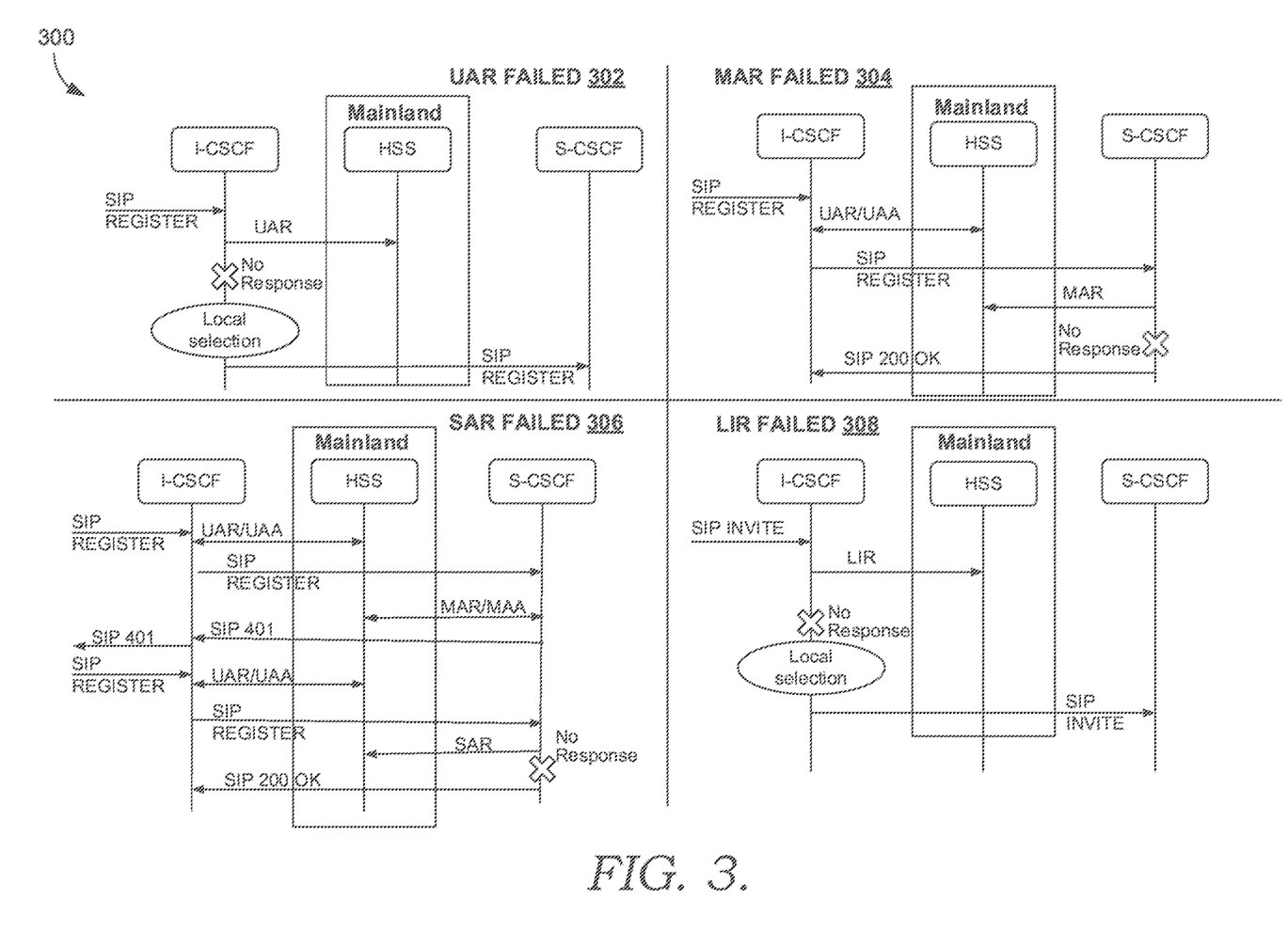
FIG. 3 depicts another example environment involving an implemented solution to the connectivity loss with the HSS, in accordance with aspects herein.

FIG. 3 depicts example environment 300 illustrating the corresponding functionality in response to the implementation of the skip HSS flag to the CSCF or the application server to bypass the connectivity loss with mainland HSS. For example, quadrant 302 illustrates one way to bypass the connectivity loss between the I-CSCF and the HSS associated with a UAR timeout. In aspects, based on determining the loss of connectivity between the I-CSCF and the HSS associated with the UAR timeout (e.g., the island I-CSCF and the mainland HSS), the skip HSS flag at the I-CSCF causes the I-CSCF to automatically select an S-CSCF based on an FQDN stored at a database associated with the I-CSCF independent of the HSS. The loss of connectivity with the HSS may be determined by not receiving a UAA from the HSS within a predetermined period of time after transmitting the UAR to the HSS. Rather than transmitting the temporary unavailable error code, the I-CSCF automatically selects the S-CSCF.

In aspects, the FQDN is stored by the DNS based on an IP address and load balancing. In some aspects, the FQDN is associated with a particular P-CSCF. In some aspects, the DNS stores FQDNs associated with individual control functions, identifier ranges, and identifier values associated with UE capabilities. Further, the database storing the FQDNs can be a Network Resource Function utilized by various network nodes where network control functions register as they are activated within the network. The identifier ranges and identifier values associated with the UE capabilities are, in some aspects, also associated with both of one or more functionalities of the network and one or more P-CSCFs.

Quadrant 304 illustrates one way to bypass the connectivity loss between the S-CSCF and the HSS associated with an MAR timeout. In aspects, based on determining the loss of connectivity between the S-CSCF and the HSS associated with the MAR timeout (e.g., the island S-CSCF and the mainland HSS), the instructions of the skip HSS flag at the S-CSCF instruct the S-CSCF to automatically transmit an SIP response to the I-CSCF (that previously transmitted the SIP response to the S-CSCF upon the I-CSCF receiving the UAA from the HSS). The SIP response to the I-CSCF indicates the MAR was successful. The SIP response (e.g., SIP 200OK) to the I-CSCF allows the I-CSCF to then register a user device without authentication from the HSS. At quadrant 304, the S-CSCF does not transmit the temporary unavailable error code (e.g., SIP 480) to the I-CSCF. As such, the system bypasses the MAR timeout and registers the UE for telecommunications services.

Quadrant 306 illustrates one way to bypass the connectivity loss between the S-CSCF and the HSS associated with an SAR timeout. In aspects, based on determining the loss of connectivity between the S-CSCF and the HSS associated with the SAR timeout, the instructions of the skip HSS flag at the S-CSCF instruct the S-CSCF to automatically transmit an SIP response to the I-CSCF. The SIP response to the I-CSCF indicates the SAR was successful. The SIP response (e.g., SIP 200OK) to the I-CSCF allows the I-CSCF to then register a user device without the SAA from the HSS. At quadrant 306, the S-CSCF does not transmit the temporary unavailable error code (e.g., SIP 480) to the I-CSCF after failing to receiving the SAA from the HSS. As such, the system bypasses the SAR timeout for registration of the UE for telecommunications services.

Bypassing the SAR timeout may further comprise applying default global iFC stored in the S-CSCF. Using the default iFC stored at the S-CSCF allows the system to apply the iFC without having to receive an iFC from the HSS. The iFCs stored at the S-CSCF may have been previously download from the HSS of a carrier. In some aspects, the iFC stored at the S-CSCF includes iFCs of an application server or TAS of a non-roaming subscriber for IMS services. The S-CSCF may implement actions based on the applied default global iFC, such as reaching out to a local application server or TAS for registering the user device.

Quadrant 308 illustrates one way to bypass the connectivity loss between the I-CSCF and the HSS associated with an LIR timeout. In aspects, based on determining the loss of connectivity between the I-CSCF and the HSS associated with the LIR timeout (e.g., the island I-CSCF and the mainland HSS), the skip HSS flag at the I-CSCF causes the I-CSCF to automatically select an S-CSCF based on an FQDN stored at a database associated with the I-CSCF independent of mainland HSS. The loss of connectivity with the HSS may be determined by not receiving a LIA from the HSS within a predetermined period of time after transmitting the LIR to the HSS. Rather than transmitting the temporary unavailable error code, the I-CSCF automatically transmits an SIP invite to the S-CSCF. The SIP invite may comprise a header containing an address associated with the user device.

Table I below provides a summary of the corresponding functionality in response to the implementation of the skip HSS flag to the CSCF or the application server to bypass the connectivity loss with mainland HSS.

| Skip HSS | At I-CSCF | At S-CSCF | At TAS or AS |
|---|---|---|---|
| ON | UAR Timeout: Proceeds with local S-CSCF selection based on stored FQDN | MAR Timeout: Relay SIP 200OK back to UE to register without authentication | UAR Timeout: Apply default profile stored in TAS or AS |
| ON | LIR Timeout: Proceeds with local S-CSCF selection based on stored FQDN | SAR Timeout: Relay SIP 200OK back to UE to register with applying default global iFC stored in S-CSCF. Perform local TAS or AS selection for UE | SNR Timeout: Apply default profile stored in TAS or AS |

Figure 4:
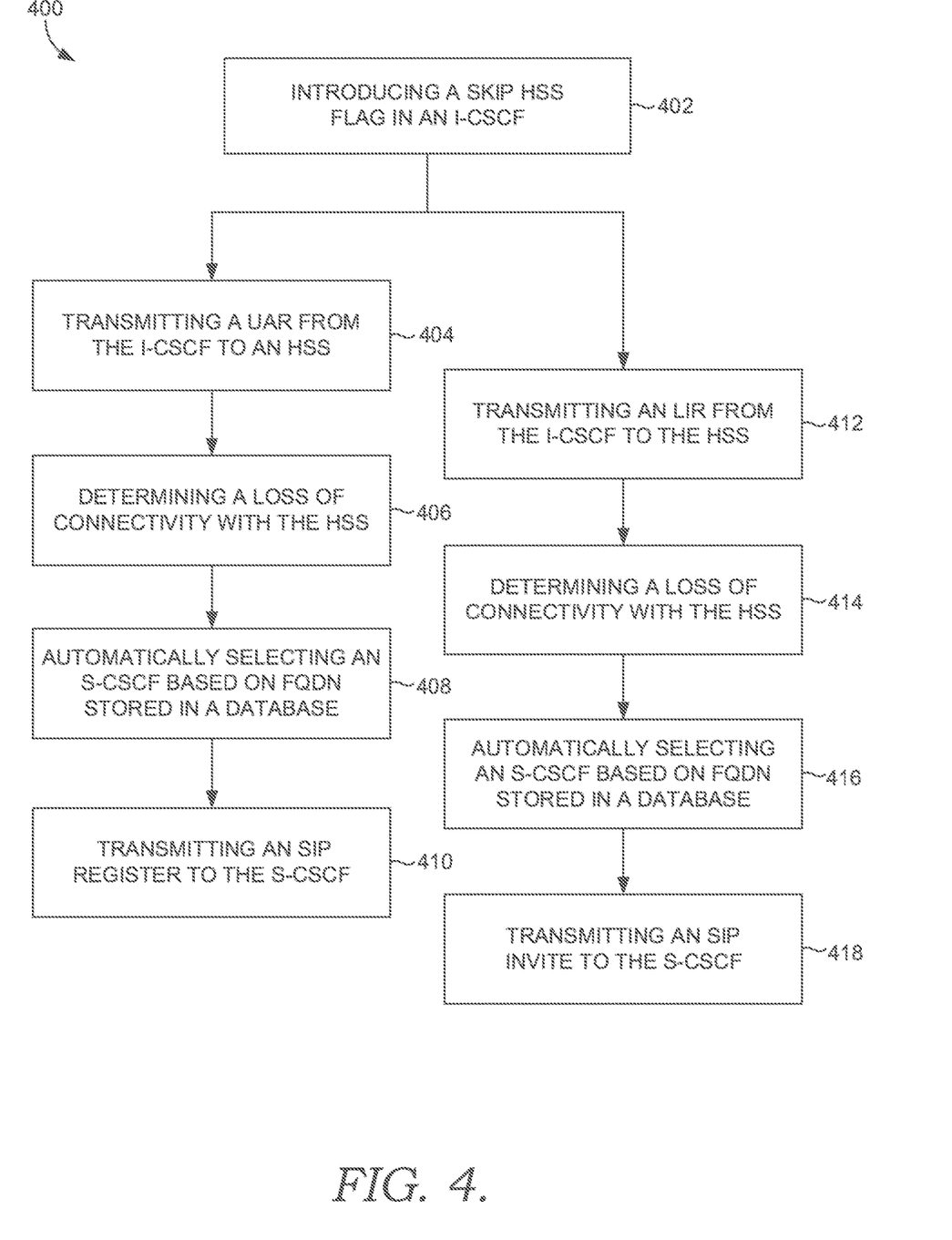
FIG. 4 depicts a flow diagram of an example method for mitigating disruption of a telecommunications network service in an Internet Protocol Multimedia Subsystem (IMS) layer, in accordance with aspects herein.

FIG. 4 depicts example flow diagram 400 of an example method for mitigating disruption of a telecommunications network service in an IMS layer. At 402, a skip HSS flag is introduced in a local I-CSCF. The skip HSS flag may comprise instructions for actions at the I-CSCF upon losses of connectivity with the HSS. For example, a node of the IMS layer comprising the I-CSCF may be located on an island and the node of the HSS may be located on a mainland. In some embodiments, the IMS layer is located at a physical distance from the HSS, wherein the physical distance is above a threshold distance. In some aspects, the instructions comprise an instruction to wait for a particular response from the HSS. In some aspects, the instruction to wait for the particular response includes a particular wait time.

At 404, a UAR is transmitted from the I-CSCF to an HSS. The UAR may be transmitted via a diameter protocol Cx interface. In aspects, the UAR includes information about a user device or a user of the user device, such as an IP Multimedia Private Identity included in an SIP Register message from the user device. In some aspects, the UAR includes the information about the user device or the user of the user device identifying a particular user profile stored at a database of an island telecommunications network services architecture or of a mainland telecommunications network services architecture. For example, the particular user profile may include information including a subscription to a service accessible via the IMS layer. The subscription information may include one or more of a type of the subscription, a class of the type of the subscription, a service plan, a network operator, a network generation, and other characteristics.

At 406, a loss of connectivity with the HSS is determined. For example, the I-CSCF or a DRA may fail to receive a UAA from the HSS in response to transmitting the UAR (from the I-CSCF, the DRA on behalf of the I-CSCF, or another diameter traffic controller on behalf of the I-CSCF). In some aspects, the loss of connectivity is determined based on not receiving the UAA within a predetermined time period. The loss of connectivity may be associated with a failure condition during a pre-establishment phase of a communication session of the user device. Further, determining the loss of connectivity may be associated with the transmission or receipt of a diameter error code (e.g., a diameter response code that is mapped to an SIP 480 or a diameter timeout).

At 408, the skip HSS flag instructs the I-CSCF to automatically select an S-CSCF based on FQDN stored in a database. The database may be associated with a DNS. In aspects, the S-CSCF is selected based on the particular user profile stored at the database of the island telecommunications network services architecture. At 410, an SIP Register message is transmitted by the I-CSCF to the S-CSCF that was selected based on the FQDN. The IMS layer uses the SIP Register message to establish a telecommunications service (e.g., a multimedia session, such as a Wi-Fi calling session) for the user device.

At 412, an LIR is transmitted from the I-CSCF to the HSS. In aspects, the LIR is requested for locating the S-CSCF where the UE is registered. In response to transmitting the LIR, at 414, the method determines a loss of connectivity with the HSS. For example, the I-CSCF or a DRA may fail to receive a LIA from the HSS in response to transmitting the LIR (from the I-CSCF, the DRA on behalf of the I-CSCF, or another diameter traffic controller on behalf of the I-CSCF). In some aspects, the loss of connectivity is determined based on not receiving the LIA within a predetermined time period. Further, determining the loss of connectivity may be associated with the transmission or receipt of a diameter error code (e.g., message diameter response code that is mapped to an SIP 480 or diameter timeout). In response to determining the loss of connectivity, at 416, the skip HSS flag instructs the I-CSCF to automatically select an S-CSCF based on FQDN stored in the database. At 418, an SIP invite is transmitted to the selected S-CSCF.

Figure 5:
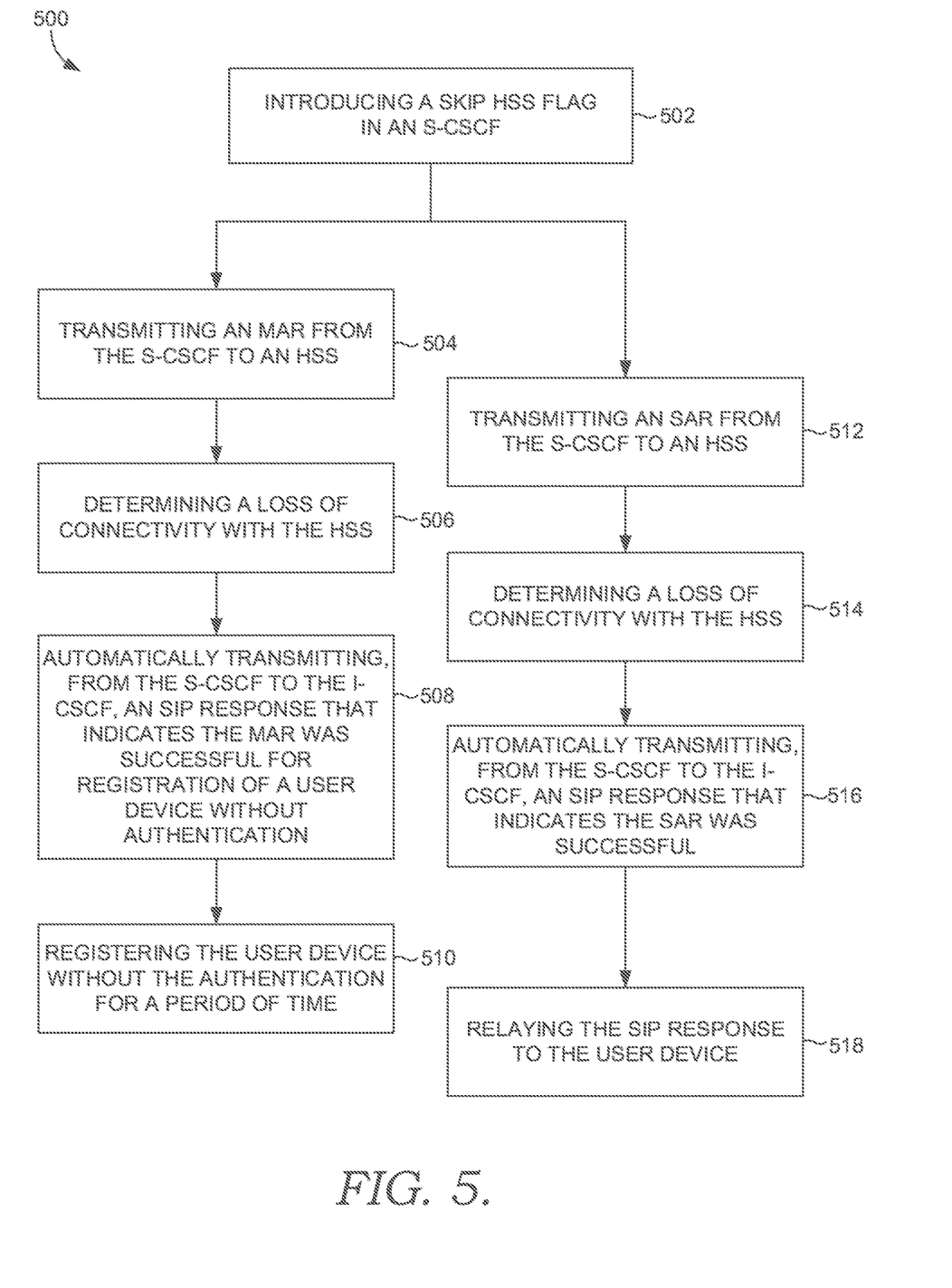
FIG. 5 depicts a flow diagram of another example method for mitigating disruption of a telecommunications network service in an IMS layer, in accordance with aspects herein.

FIG. 5 depicts example flow diagram 500 of another example method for mitigating disruption of a telecommunications network service in an IMS layer. At 502, a skip HSS flag is introduced in an S-CSCF. The skip HSS flag may comprise instructions for actions at the S-CSCF upon losses of connectivity with the HSS. For example, a node of the IMS layer comprising the S-CSCF may be located on an island and the node of the HSS may be located on a mainland. In some embodiments, the IMS layer is located at a physical distance from the HSS, wherein the physical distance is above a threshold distance. In some aspects, the instructions comprise an instruction to wait for a particular response from the HSS. In some aspects, the instruction to wait for the particular response includes a particular wait time.

At 504, an MAR is transmitted from the S-CSCF to an HSS. For example, the MAR may be transmitted to the HSS from the S-CSCF, the DRA on behalf of the S-CSCF, or another diameter traffic controller on behalf of the S-CSCF. At 506, a loss of connectivity with the HSS is determined based on transmitting the MAR. For example, the S-CSCF, DRA, or other diameter traffic controller may fail to receive an MAA from the HSS. In some aspects, the loss of connectivity is determined based on not receiving the MAA within a predetermined time period. The loss of connectivity may be associated with a failure condition during a pre-establishment phase of a communication session of the user device. Further, determining the loss of connectivity may be associated with the transmission or receipt of a diameter error code (e.g., message diameter response code that is mapped to SIP 480 or diameter timeout).

At 508, the skip HSS flag instructs the S-CSCF to automatically transmit, to the I-CSCF, an SIP response that indicates the MAR was successful for registration of a user device without HSS authentication. At 510, the user device is registered without the authentication. In some embodiments, the registration without the authentication is only for a particular period of time.

At 512, an SAR is transmitted from the S-CSCF to the HSS. At 514, the method determines a loss of connectivity with the HSS based on transmitting the SAR. For example, the S-CSCF, DRA, or other diameter traffic controller may fail to receive an SAA from the HSS. In some aspects, the loss of connectivity is determined based on not receiving the SAA within a predetermined time period. The loss of connectivity may be associated with a failure condition during a pre-establishment phase of a communication session of the user device. Further, determining the loss of connectivity may be associated with the transmission or receipt of a diameter error code (e.g., a message diameter response code that is mapped to SIP 480 or diameter timeout).

At 516, the skip HSS flag instructs the S-CSCF to automatically transmit, to the I-CSCF, an SIP response that indicates the SAR was successful. As such, the user device is registered without HSS authentication. At 518, the SIP response is relayed to the user device for registration. iFC stored at the S-CSCF may be applied to register the user device. Based on relaying the SIP response and applying the iFC, an application server or TAS may be selected for the user device.

Figure 6:
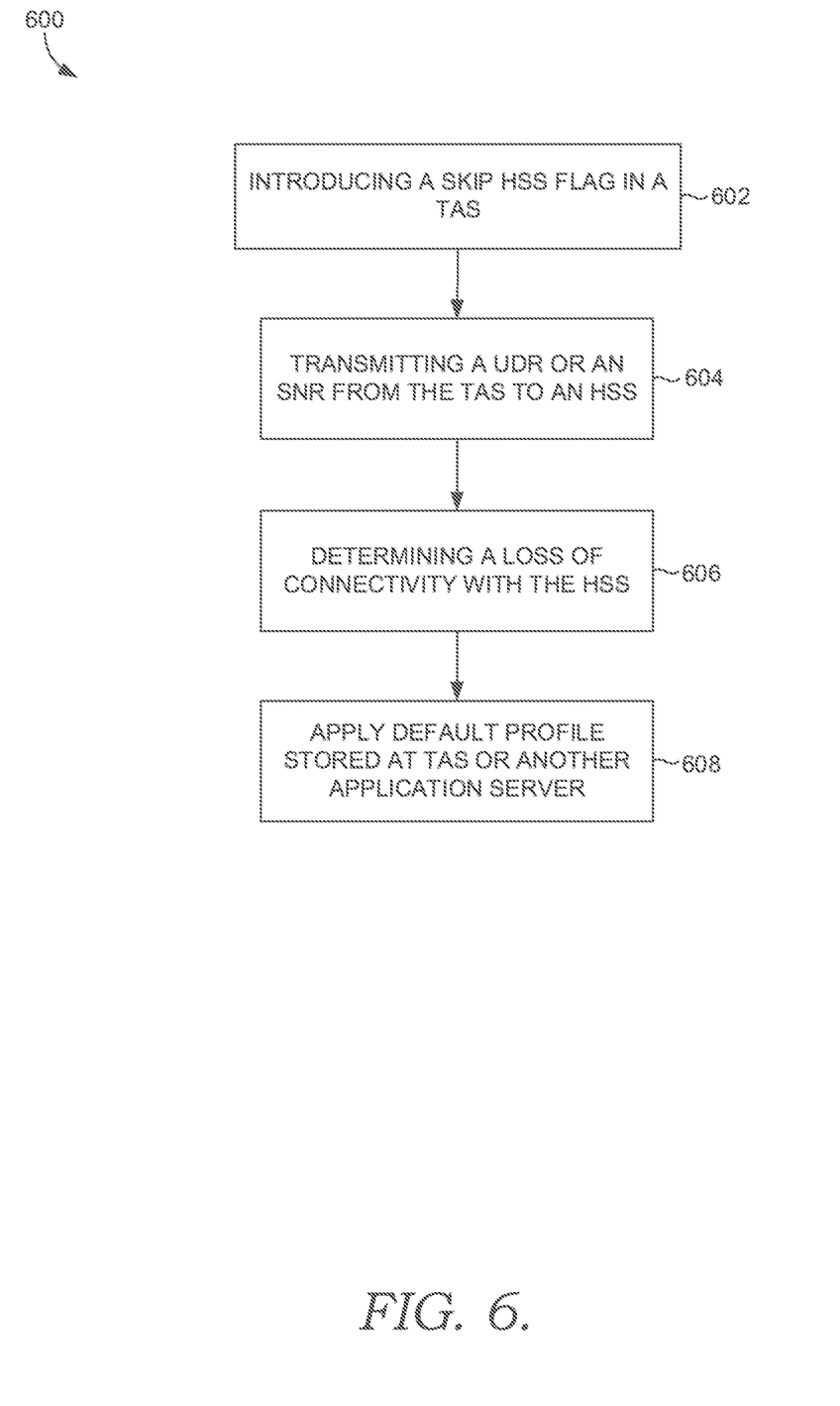
FIG. 6 depicts a flow diagram of yet another example method for mitigating disruption of a telecommunications network service in an IMS layer, in accordance with aspects herein.

FIG. 6 depicts example flow diagram 600 of another example method for mitigating disruption of a telecommunications network service in an IMS layer. At 602, a skip HSS flag is introduced in an application server or a TAS. The skip HSS flag may comprise instructions for actions at the application server or TAS upon losses of connectivity with the HSS. For example, a node of the IMS layer comprising the application server or TAS may be located on an island and the node of the HSS may be located on a mainland. In some embodiments, the IMS layer is located at a physical distance from the HSS, wherein the physical distance is above a threshold distance. In some aspects, the instructions comprise an instruction to wait for a particular response from the HSS. In some aspects, the instruction to wait for the particular response includes a particular wait time.

At 604, a UDR or an SNR is transmitted from the application server or TAS to an HSS. For example, the UDR or SNR may be transmitted to the HSS from the application server or TAS, from the DRA on behalf of the application server or TAS, or another diameter traffic controller on behalf of the application server or TAS. At 606, a loss of connectivity with the HSS is determined. For example, the application server, TAS, DRA, or other diameter traffic controller may fail to receive a UDA or SNA from the HSS.

At 608, the skip HSS flag instructs the application server or TAS to apply a default profile. The default profile, in some aspects, is stored at the TAS or at the application server. The default profile may include information associated with a subscription to a service accessible via the IMS layer. The subscription information may include one or more of a type of the subscription, a class of the type of the subscription, a service plan, a network operator, a network generation, and other characteristics.

Figure 7:
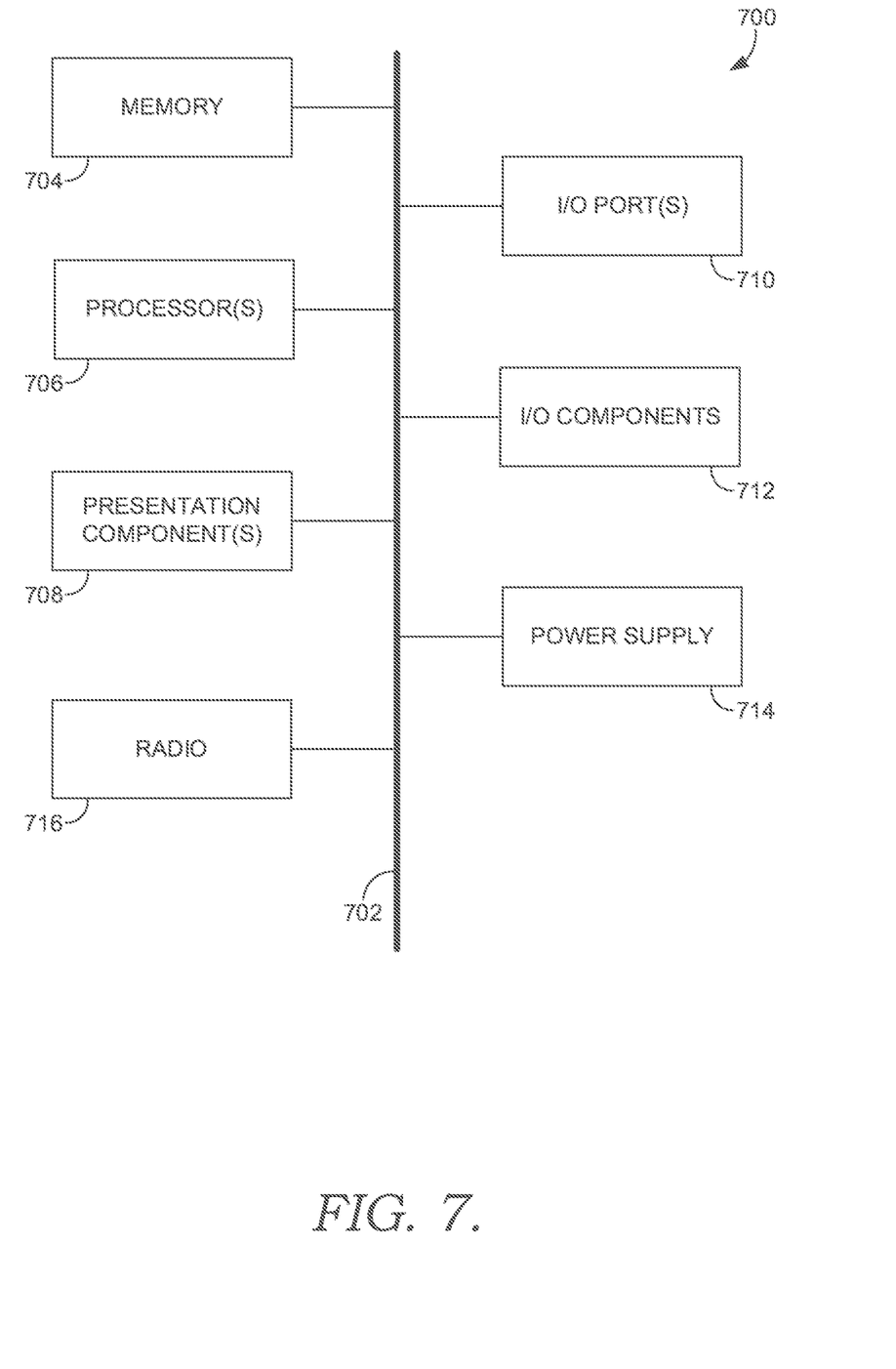
FIG. 7 depicts an exemplary computing environment suitable for use in implementations of the present disclosure, in accordance with aspects herein.

Turning now to FIG. 7, a diagram is depicted of an exemplary computing environment suitable for use in implementations of the present disclosure. In particular, the exemplary computer environment is shown and designated generally as UE/user device 700. User device 700 is but one example of a suitable computing environment and is not intended to suggest any limitation as to the scope of use or functionality of the invention. Neither should user device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

User device 700 may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device that communicates via wireless communications to interact with a public or private network.

In aspects, user device 700 may be configured to communicate using telecommunications network services providing 3G, 4G (e.g., LTE), 5G, 6G, other generations, or a combination thereof. For example, the user device 700 comprises components capable of establishing a 5G connection with a 5G gNB to be served according to 5G over that connection. In some aspects, user device 700 is an E-UTRAN New Radio—Dual Connectivity (ENDC) device that allows user device 700 to connect to an LTE eNB that acts as a master node and a 5G gNB that acts as a secondary node. Continuing the example, the ENDC device may access both LTE and 5G simultaneously, and in some cases, on the same spectrum band.

With continued reference to FIG. 7, user device 700 includes bus 702 that directly or indirectly couples the following devices: memory 704, one or more processors 706, one or more presentation components 708, input/output (I/O) port(s) 710, I/O component(s) 712, power supply 714, and radio(s) 716. Bus 702 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 712. Also, processors, such as one or more processors 706, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 700 typically includes a variety of computer-readable media. Computer-readable media can be any available media that can be accessed by user device 700. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 704, memory 704 includes computer-storage media in the form of volatile or nonvolatile memory. Memory 704 may be removable, nonremovable, or a combination thereof. Examples of memory 704 include solid-state memory, hard drives, optical-disc drives, etc. For instance, memory 704 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 706, the one or more processors 706 read data from various entities such as bus 702, memory 704 or I/O component(s) 712. The one or more processors 706 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 706 execute instructions, for example, of an Operating System of the user device 700 or of one or more suitable applications.

Further, the one or more presentation components 708 present data indications to a person or other device. Examples of one or more presentation components 708 include a display device, speaker, printing component, vibrating component, etc. Additionally, I/O port(s) 710 allow user device 700 to be logically coupled to other devices including I/O component(s) 712, some of which may be built in user device 700. Illustrative I/O component(s) 712 include a microphone, joystick, game pad, satellite dish, scanner, printer, wireless device, etc. Furthermore, power supply 714 may include any suitable source of power, such as a rechargeable lithium polymer battery or an alternating current power converter.

Turning to radio 716, the radio 716 facilitates communication with a wireless telecommunications network. For example, radio 716 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 716 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via millimeter waves, FD-MIMO, massive MIMO, 3G, 4G, 5G, or 802.11 protocols and techniques, etc.

Illustrative wireless telecommunications technologies that radio 716 may facilitate include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for mitigating disruption of a telecommunications network service in an Internet Protocol Multimedia Subsystem layer, the system comprising:
   a diameter routing agent (DRA);
   one or more processors; and
   computer memory storing computer-usable instructions that, when executed by the one or more processors, cause the DRA to perform operations comprising:
   introducing a skip Home Subscriber Server (HSS) flag in a Call Session Control Function (CSCF) or an application server associated with the DRA;
   transmitting, via the CSCF or the application server, a request to an HSS;
   in response to transmitting the request, determining a loss of connectivity between the DRA and the HSS; and
   based on determining the loss of connectivity between the DRA and the HSS:
   automatically selecting a local Serving CSCF based on a Fully Qualified Domain Name and based on instructions of the skip HSS flag; or
   automatically transmitting a Session Initiation Protocol (SIP) response that indicates the request was successful to a local Interrogating CSCF for relay to a user device for registration based on the instructions of the skip HSS flag.

2. The system according to claim 1, wherein the DRA is located on an island and the HSS is located on a mainland.

3. The system according to claim 2, wherein the request is transmitted via the local Interrogating CSCF, and wherein the local Serving CSCF is automatically selected in response to determining the loss of connectivity with the HSS.

4. The system according to claim 3, wherein the request to the HSS is a user authorization request, and wherein determining the loss of connectivity between the DRA and the HSS comprises failing to receive a user authorization answer from the HSS within a predetermined period of time after transmitting the user authorization request.

5. The system according to claim 4, wherein the operations further comprise transmitting an SIP Register message from the local Interrogating CSCF to the local Serving CSCF that is automatically selected.

6. The system according to claim 3, wherein the request to the HSS is a location information request, and wherein determining the loss of connectivity between the DRA and the HSS comprises failing to receive a location information answer from the HSS within a predetermined period of time after transmitting the location information request.

7. The system according to claim 6, wherein the operations further comprise transmitting an SIP invite, from the local Interrogating CSCF to the local Serving CSCF that is automatically selected.

8. The system according to claim 2, wherein the request is a multimedia authorization request transmitted via the local Serving CSCF to the HSS, and wherein the SIP response that indicates the request was successful is automatically transmitted from the local Serving CSCF back to the local Interrogating CSCF for the user device to register without authentication in response to determining the loss of connectivity.

9. The system according to claim 8, wherein determining the loss of connectivity between the DRA and the HSS comprises failing to receive a multimedia authorization answer from the HSS within a predetermined period of time after transmitting the multimedia authorization request.

10. The system according to claim 2, wherein the request is a server assignment request transmitted via the local Serving CSCF to the HSS, and wherein the SIP response that indicates the request was successful is automatically transmitted from the local Serving CSCF back to the local Interrogating CSCF in response to determining the loss of connectivity.

11. The system according to claim 10, wherein the operations further comprise:
relaying the SIP response to the user device for registration;
applying initial filter criteria stored at the local Serving CSCF for registration of the user device; and
selecting a telephony application server for the user device.

12. The system according to claim 2, wherein determining the loss of connectivity between the DRA and the HSS is based on a diameter error code corresponding to an HSS diameter procedure.

13. The system according to claim 12, wherein the request is a user authorization request transmitted via the application server that is a telephony application server, and wherein the local Serving CSCF is automatically selected in response to determining the loss of connectivity with the HSS.

14. A method for mitigating disruption of a telecommunications network service in an Internet Protocol Multimedia Subsystem (IMS) layer, the method comprising:
transmitting, via a diameter routing agent (DRA) associated with a local Interrogating Call Session Control Function (I-CSCF) and a local Serving Call Session Control Function (S-CSCF), a request to a home subscriber server (HSS) that is located above a threshold distance from an access point associated with the DRA;
determining a loss of connectivity between the DRA and the HSS based on transmitting the request to the HSS; and
based on determining the loss of connectivity:
automatically selecting the S-CSCF based on a Fully Qualified Domain Name when the request is transmitted by the I-CSCF to the HSS;
automatically transmitting, from the S-CSCF to the I-CSCF, a Session Initiation Protocol (SIP) response that indicates the request was successful for registration of a user device when the request is transmitted by the S-CSCF to the HSS; and
transmitting an initial request that is a user authorization request to the HSS from the I-CSCE;
receiving a user authorization answer from the HSS based on transmitting the initial request;
transmitting, from the I-CSCF, an SIP Register message to the S-CSCF in response to receiving the user authorization answer;
transmitting, from the S-CSCF, the request that is a multimedia authorization request to the HSS based on the SIP Register message;
determining the loss of connectivity between the DRA and the HSS based on transmitting the multimedia authorization request; and automatically transmitting, from the S-CSCF to the I-CSCF, the SIP response that indicates the request was successful for registration of the user device without authorization based on determining the loss of connectivity; or
transmitting an initial request that is a user authorization request to the HSS from the I-CSCF;
receiving a user authorization answer from the HSS based on transmitting the initial request;
transmitting, from the I-CSCF, an SIP Register message to the S-CSCF in response to receiving the user authorization answer;
transmitting, from the S-CSCF, the request that is a server assignment request to the HSS based on the SIP Register message;
determining the loss of connectivity between the DRA and the HSS based on transmitting the server assignment request;
automatically transmitting, from the S-CSCF to the I-CSCF, the SIP response that indicates the request was successful for registration of the user device based on determining the loss of connectivity;
relaying the SIP response to the user device for registration;
applying initial filter criteria stored at the S-CSCF for registration of the user device; and
selecting a telephony application server for the user device.

15. One or more non-transitory computer storage media having computer-executable instructions embodied thereon that, when executed by one or more processors, cause the one or more processors to perform a method for mitigating disruption of a telecommunications network service in an Internet Protocol Multimedia Subsystem (IMS) layer, the method comprising:
transmitting, via a diameter routing agent (DRA) associated with a local Interrogating Call Session Control Function (I-CSCF) and a local Serving Call Session Control Function (S-CSCF), a request to a home subscriber server (HSS) that is located above a threshold distance from an access point associated with the DRA, wherein the I-CSCF or the S-CSCF has a skip HSS flag comprising instructions for connectivity loss between the DRA and the HSS;
determining a loss of connectivity between the DRA and the HSS based on transmitting the request to the HSS; and
based on determining the loss of connectivity and the instructions of the skip HSS flag:
automatically selecting the S-CSCF in response to transmitting the request, which is a user authorization request or a location information request, from the I-CSCF to the HSS; or
automatically transmitting, from the S-CSCF to the I-CSCF, a Session Initiation Protocol (SIP) response that indicates the request, which is a multimedia authorization request or a server assignment request, was successful for registration of a user device in response to transmitting the request from the S-CSCF to the HSS.

16. The one or more non-transitory computer storage media of claim 15, wherein the DRA is located on an island and the HSS is located on a mainland, and wherein determining the loss of connectivity between the DRA and the HSS comprises failing to receive a multimedia authorization answer from the HSS within a predetermined period of time after transmitting the request.

17. The one or more non-transitory computer storage media of claim 15, wherein determining the loss of connectivity between the DRA and the HSS is based on a diameter error code corresponding to an HSS diameter procedure.

18. The one or more non-transitory computer storage media of claim 17, wherein the instructions of the skip HSS flag comprise an instruction to wait for a response from the HSS upon determining the diameter error code includes an SIP response associated with a request timeout.

\* \* \* \* \*